(12) United States Patent
Bonomi et al.

(10) Patent No.: US 6,292,492 B1
(45) Date of Patent: Sep. 18, 2001

(54) EFFICIENT METHOD AND APPARATUS FOR ALLOCATING MEMORY SPACE USED FOR BUFFERING CELLS RECEIVED ON SEVERAL CONNECTIONS IN AN ASYNCHRONOUS TRANSFER MODE (ATM) SWITCH

(75) Inventors: Flavio Giovanni Bonomi, Palo Alto; Suhas Anand Shetty, San Jose; De Bao Vu, Fremont; William Stanley Evans, Menlo Park, all of CA (US)

(73) Assignee: CSI Zeitnet (A Cabletron Systems Company), Santa Clara, CA (US)

( * ) Notice: Subject to any disclaimer, the term of this patent is extended or adjusted under 35 U.S.C. 154(b) by 0 days.

(21) Appl. No.: 09/081,969

(22) Filed: May 20, 1998

(51) Int. Cl.$^7$ .................................................. H04L 12/54
(52) U.S. Cl. ............................................ 370/415; 370/429
(58) Field of Search .................................. 370/389, 390, 370/395, 396, 398, 412, 413, 414, 415, 416, 417, 418, 422, 426, 428, 429, 432, 229, 230, 232, 235

(56) References Cited

U.S. PATENT DOCUMENTS 5,724,358 * 3/1998 Headrich et al. .................... 370/418

* cited by examiner

*Primary Examiner*—Kwang B. Yao
(74) *Attorney, Agent, or Firm*—Law Firm of Naren Thappeta (57) ABSTRACT

A switch guaranteeing a minimum amount of memory space for desired connection while allowing efficient dynamic change of maximum memory space that can be used by a connection. Only an amount of memory space which is required for guaranteeing the minimum amount of memory space is reserved. When the reserved space is decremented due to new cells being received on connections, the maximum memory space reserved for each connection is dynamically increased. For multicast connections, only a single copy of the cell data is stored even though a multicast cell is transmitted on several ports. Multicast cells can also be processed using the same signals used for processing unicast cells.

22 Claims, 6 Drawing Sheets

EFFICIENT METHOD AND APPARATUS FOR ALLOCATING MEMORY SPACE USED FOR BUFFERING CELLS RECEIVED ON SEVERAL CONNECTIONS IN AN ASYNCHRONOUS TRANSFER MODE (ATM) SWITCH

RELATED APPLICATIONS

The present application is related to the following co-pending United States Patent Applications, which are incorporated in their entirety herewith:

1. Patent Application Entitled, "Queue Management with Support for Multicasts in an Asynchronous Transfer Mode (ATM) Switch", application Ser. No. 08/977,661, Filed Nov. 24, 1997, (hereafter "RELATED APPLICATION 1"); and
2. Patent Application Entitled, "A Flexible Scheduler in an Asynchronous Transfer Mode (ATM) Switch", application Ser. No. 08/976,686, Filed Nov. 24, 1997, and (hereafter "RELATED APPLICATION 2").

BACKGROUND OF THE INVENTION

1. Field of the Invention

The present invention relates generally to communication networks, and more specifically to a method and apparatus for allocating memory space shared by several connections in an asynchronous transfer mode (ATM) switch.

2. Related Art

Switches are commonly used in communication networks for providing connectivity between end-systems. A switch generally receives a packet of data on a port from another switch or an end-system and forwards the packet on another port to another switch or an end-system. The packet may thus be forwarded by a sequence of switches located between a source end-system and a destination end-system until the packet is received at the destination end-system. The packets forwarded can provide the basic frame-work for implementing different applications (such as data sharing, voice, video) on the end-systems connected to a communication network.

A network based on asynchronous transfer mode (ATM) standard is an example of such a communication network. The packets in an ATM network are defined to have a predetermined small size, and are generally termed as cells. By keeping the cell size small and forwarding different cells with different priorities, ATM networks generally provide a shared communication backbone for different types of applications. For example, cells related to voice and video applications may be forwarded with a low latency, while cells related to data network applications may be provided large bandwidths in bursts. In general, sharing of the communication backbone among several applications (and end-systems) leads to lower latency (for transmission of cells end-to-end), better utilization of the bandwidth on the communication network, and easier management of the communication network.

To communicate with another end-system, an end-system of an ATM network usually 'opens a connection'. Opening a connection generally refers to determining a sequence of switches between the two end-systems such that the switches provide at least one communication path between the two end-systems with any specific service levels required for the communication. The service levels are generally defined by the quality of service (QoS) parameters as is well known in the relevant arts.

Once a connection is established, the end systems communicate with each other using cells over the established communication path. As noted above, the switches in the communication path receive cells on one port and forward the received cells on another port to support the connection. A switch is typically in the communication path of several connections, and accordingly receives cells on several connections. As should be readily appreciated, different connections may be set up with different QoS parameters.

A switch typically needs to buffer at least some of the received cells before forwarding the buffered cells on the corresponding ports. Cells may be buffered for several reason. For example, the cells destined on an output port may be received in a burst and sufficient bandwidth may not be available to immediately forward the received cells on the destined ports. In addition, a switch may need to transmit cells in an order different from the order in which the cells are received to service different connections according to different QoS parameters. As an illustration, a cell received on a high-bandwidth connection may need to be transmitted ahead of a cell received earlier on a low-bandwidth connection.

A switch may need to use a memory to buffer cells received on various connections. In general, the memory is shared by some or all connections. Without such sharing, unacceptably large memories may be required for buffering cells received in a switch.

However, sharing of memory by several connections can cause several problems. For example, a few connections may use all the available memory, leaving no memory space for other connections. The excessive memory use can be, for example, due to the high data transmission demands placed by an end application or even due to an end application transmitting data in error.

To prevent connections from using excessive memory space, a switch may set an upper limit (upper threshold) on the amount of memory a given connection can use. The upper threshold can be dynamically varied to facilitate effective sharing of the memory space. For example, the upper threshold may be decremented during periods of high congestion, and incremented during periods of less congestion.

Typically, the aggregate of the upper thresholds of all connections is usually much larger than the available memory space because only some of the connections may be using the maximum set thresholds. As a result, in spite of the upper threshold oln memory usage on each connection, it is possible that some of the active connections together will use all the available memory space, leaving limited or no memory space for cells received on other connections. At least in view of the possibility that some connections may use undue amounts of memory space, it may be desirable to guarantee a minimum amount of memory space for some type of connections.

In one scheme, a switch may reserve memory space equal to the aggregate minimum memory space required for the connections until all connections have been allocated (i.e., used or reserved) the corresponding minimum memory space. That is, assuming a queue (i) having a present length of Qi is maintained for each connection, and a minimum memory space of Min is to be allocated for each queue, a memory space equal to $\Sigma Min_i$ (for all i) is reserved in the memory until $Q_i >= Min_i$, for all connections (i). Once the >=(greater than or equal to) condition is satisfied for all the queues (or i values), no memory space may be reserved for guaranteeing the minimum requirement.

One problem with the above described scheme is that the shared memory space may not be optimally utilized as some connections may already have been using more than the corresponding minimum memory space. Such sub-optimal use can be problematic at least in switches which handle a large number of connections because the remaining (unreserved) memory may not be sufficient to buffer (and process) the cells received on these connections.

In another scheme, a switch may reserve memory space equal to $\Sigma M_i$ only for connections where $Q_i < Min_i$. That is, a memory space equal to $Min_i$ is reserved only if the corresponding connection has not used the minimum memory space. Such a scheme offers the advantage that a connection using more than the corresponding minimum memory space does not cause memory space to be reserved.

However, some of the connections using some memory space less than the corresponding minimum memory space cause a memory space equal to the minimum memory space to be reserved. As will be readily appreciated, such reservation also leads to sub-optimal utilization of the memory space and may be undesirable.

Therefore, what is needed is a method and apparatus which use memory space optimally while providing minimum memory space to any desired connection. In addition, the method and apparatus may need to limit the maximum amount of memory used by a connection. Further, the method and apparatus need to be scalable to switches serving several ports and/or several thousands of connections.

It if further desirable that the method and apparatus accurately and efficiently provide a guaranteed minimum memory space for multicast connections also. Multicasting typically refers to the ability of one end-station (source end station) to send a cell to several end-stations (target end-stations) without the source end-station having to retransmit the cell to the individual target end stations. Thus, a multicast connection may be viewed as a tree having several output branches corresponding to a single root or source. To process cells received on a multicast connection, a switch usually needs to forward each received cell on several ports.

Thus, what is also needed is a switch which accurately provides a minimum amount of memory space to buffer cells received on multicast connections while transmitting each cell several times.

SUMMARY OF THE INVENTION

The present invention is directed to a switch including a memory. The switch uses the memory to buffer cells received on several connections. The cells can be either unicast cells or multicast cells. The processing of unicast cells is described first.

Each connection (unicast and multicast) is guaranteed a desired amount of minimum memory space (lower threshold). In accordance with the present invention, only that amount of memory as required for guaranteeing the desired lower thresholds of memory space is reserved. That is, as a unicast cell is received on a connection using less than the corresponding lower threshold, the amount of reserved memory space is decreased. When the transmission of a unicast cell is complete on a connection using less than the corresponding desired lower threshold, the amount of memory space reserved for the connection is increased.

In addition, an upper threshold on the amount of memory space that can be used by a connection can be optionally set. The upper thresholds can be varied dynamically to take advantage of the increase and decrease of the amount of memory space reserved for guaranteeing minimum amount of memory space to the desired connections. That is, as the amount of reserved memory space is increased, the upper thresholds can be decremented. On the other hand, if the amount of reserved memory space is decreased, the upper thresholds can be increased. As a result, the present invention provides an efficient way to allocate memory space shared by several connections.

An aspect of the present invention enables the implementations to scale to large switches which need to support several connections on several ports. The ports are organized on a plurality of port cards, with each port card including a few ports. Each port card includes a traffic manager which keeps track of the amount of memory space (queue length) used by each connection. When the queue length of a unicast connection is less than the corresponding minimum threshold, the traffic manager generates signals indicating whether the amount of reserved memory needs to be increased. Specifically, traffic manager generates a reservation decrement signal when a cell is accepted on a connection and the queue length of the connection is less than the corresponding minimum threshold. A reservation increment signal is generated when a cell is transmitted with the queue length being less than the corresponding minimum threshold.

A memory manager receives the reservation increment and decrement signal. The memory manager can also be responsible for allocating and deallocating memory locations of shared memory for storing cell data. The memory manager increases and decreases the amount of memory space reserved for guaranteeing lower thresholds in response to reservation increment and decrement signals respectively. As the central memory manager is relieved from having to maintain queue lengths and minimum thresholds, the central storage and computation requirements are greatly reduced, enabling the switch to scale well to large networks.

According to another aspect of the present invention, the upper and lower thresholds can be maintained when the switch supports multicasting function also. Only a single copy of the cell data is maintained to conserve memory space usage. However, each branch of the multicast connection can be processed independently by traversing a linked list defining the cell storage locations and cell order.

The present invention enables the traffic managers and memory manager to support multicast cell processing using the same signals (e.g., reservation increment, reservation decrement, accept, and reject) as those used for processing unicast cells. In addition, the central components may be relieved of maintaining counters as in the case of processing unicast cells, which feature enables a switch to scale to larger environments in accordance with the present invention. Further more, the schemes are designed to handle cases in which a branch of the multicast connection does not accept the cell for transmission. As should be understood, a multicast connection can be viewed as having multiple branches, with each branch corresponding to a transmission path of the multicast connection, and a decision may be made not transmit on a branch due to, for example, congestion on that branch.

The manner in which the features noted in the preceding paragraph can be achieved in example embodiments is described now. The operation of the embodiments can be appreciated best by understanding the manner in which counters (for reservation, queue lengths etc.) are maintained and signaling is performed. Accordingly, these are described below.

In one embodiment, each traffic manager maintains a counter for queue length ($Q_i$), which may be defined to be the longest branch of a multicast connection served by the corresponding port card. Therefore, when a multicast cell is accepted by at least one branch of a port card, $Q_i$ for that port-card (branch) is incremented in the corresponding traffic manager. $Q_i$ is decremented when the last branch served by the port card transmits the multicast cell. Therefore, an accept signal is sent to the central memory manager when a multi-cast cell is accepted on at least one branch. The central manager is designed to increment the total of queue lengths ($Q_{Tot}$) only once even if acceptance is received from multiple port cards.

To provide reservation in accordance with the present invention, a port card may send a reject signal when a cell is not accepted on any branches served by the port card. In an alternative embodiment, a reject signal is sent when a multi-cast cell is not accepted by at least one branch served by the corresponding port card. In both embodiments, in response to a reject signal received from at least one port card, the central memory manager may not modify the reservation related counters even if a reservation decrement signal is received from any port card. A reservation decrement signal is sent by a port card, for example, if the queue length ($Q_i$) is less than the corresponding minimum threshold. The central memory manager does not increment when the transmission of the multicast cell is complete. In summary, reservation parameters are modified only if a reject signal is not received from any port card according to one aspect of the present invention.

Thus, while processing a multicast cell, the memory manager decrements reservation variable $\mu_{Tot}$ in response to a $\mu$-decrement signal when no reject signal is received. When a multicast cell is transmitted, $\mu_{Tot}$ may need to be incremented if $\mu_{Tot}$ depending on the length of queue $Q_i$ as noted above. In a first embodiment, the $\mu_{Tot}$ is incremented when the first completion of transmission signal is received. A port card may send a completion signal after a multicast cell is transmitted on all branches (served by the port card) the multicast cell relates to. In an alternative embodiment, $\mu_{Tot}$ is incremented after the reception of the last completion of transmission signal. As may be apparent, the first embodiment ensures the availability of minimal space according to $\mu_i$ for the fastest branch, while the alternative embodiment operates to guarantee minimal space according to the $\mu_i$ of the slowest branch. Accordingly, more space is likely to be reserved in the first embodiment, and generally leads to the advantage that more probability exists that the space is reserved for a multicast connection as desired.

Therefore, the present invention enables the efficient allocation of memory while guaranteeing a lower threshold of amount of memory space for each connection and enabling an upper threshold to be set on the amount of memory space which can be used by each connection. Efficiency is achieved by reserving only that amount of memory space as is required to guarantee the corresponding lower thresholds. Further efficiency is achieved by dynamically changing the upper thresholds to be higher when the amount of allocated (user or reserved) memory space is low and to be lower when the amount of allocated memory space is higher.

The present invention scales well to large switches. This can be accomplished by having a traffic manager which keeps track of the queue lengths of connections and the thresholds, and determining locally whether to accept or reject cells. The traffic managers send simple signals to communicate reservation increments and decrements, and cell acceptance and rejections. As the central memory manager is relieved of the computational and storage requirements, the switch can scale to large environments.

The present invention enables unicast connections to be processed as a special case of a multicast signal by using the same signals between the memory manager and the traffic managers for processing both types of cells.

The present invention supports the efficient storage and precessing of multicast cells. This is accomplished by maintaining only a single copy of the cell data to conserve memory space usage and processing requirements. To support the single copy scheme, the traffic managers and memory manager are designed view a queue length of the connection to equal to the length of the longest branch of the multicast connection.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The manner in which the memory used for buffering cells can be managed in accordance with the present invention will be described with reference to communication network 100 of FIG. 1, which is a block diagram illustrating an example environment in which the present invention can be implemented. Communication network 100 includes ATM network (backbone) 150 connecting end-systems 110-A, 110-B, 110-C, and 110-X. ATM network 150 includes ATM switches 120-A, 120-B, 120-C, 120-D, 120-E, 120-F, and 120-X. Collectively or individually the end-systems will be referred by reference numeral 110 as will be clear from the context. Similarly, switch 120 will refer to either one of the switches or to the group as a whole.

Figure 1:
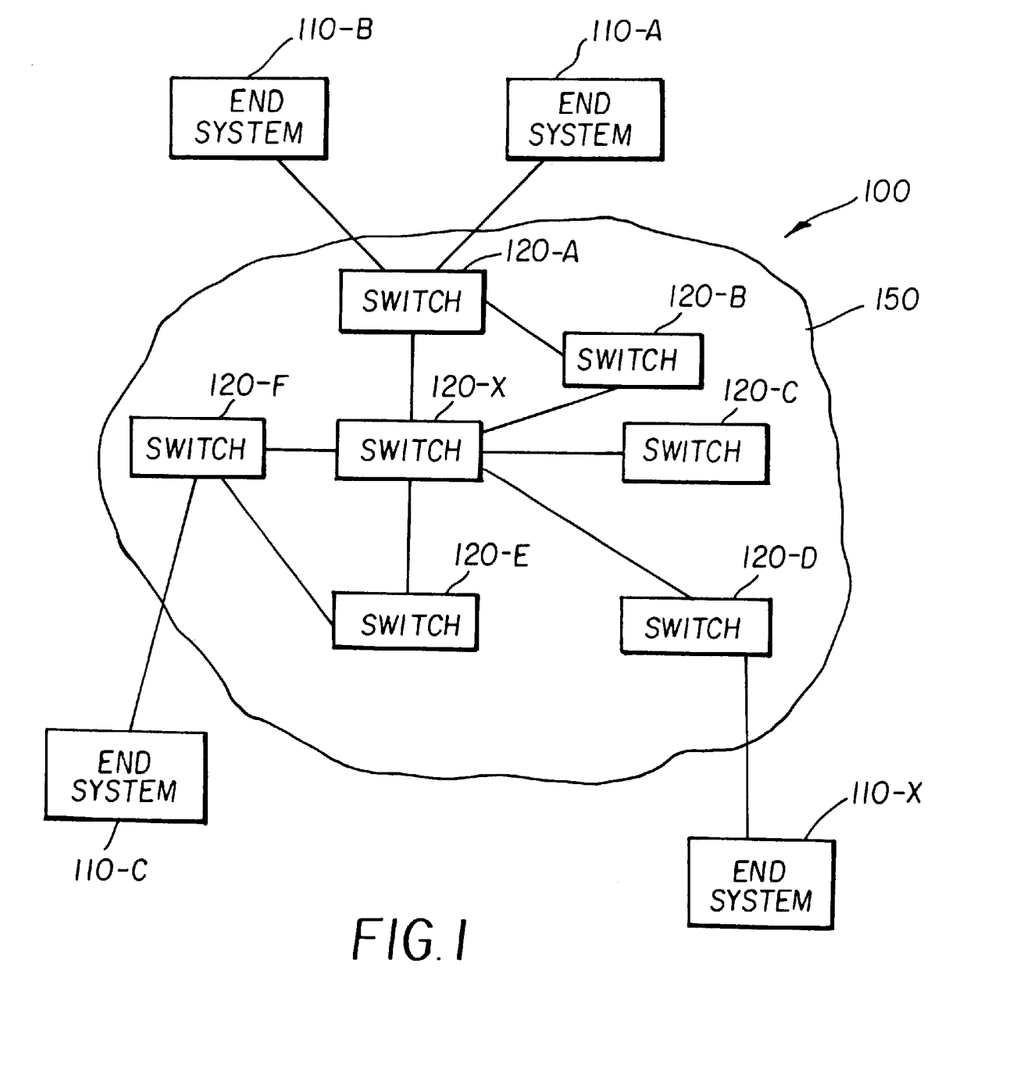
FIG. 1 is a block diagram illustrating an example environment in which the present invention can be implemented.

For purpose of illustration only, a simple communication network environment is depicted in FIG. 1. In reality, communication networks can include several thousands of end-systems. As used in the present application, an end-system refers to any system connecting to a switch of a communication network 100 according to a pre-specified protocol. Examples of such end-systems include, but not limited to, ATM routers of data networks (which aggregate traffic from several computer systems), PBXs of voice networks (which aggregate traffic from several telephone systems), and a computer system which communicates directly with an ATM switch. Similarly, ATM network 150 can also include several thousands of switches 120. In fact, ATM network 150 can span several networks, in turn connected by switches.

The present invention can be implemented in one or more of switches 120. Several aspects of the present invention can be better appreciated with an understanding of the logical flow of cells in an example switch. Accordingly, the logical flow of cells in an example switch is explained below.

2. Logical Flow of Received Cells in an Example Switch

Broadly, ATM switch 120 receives a cell with a given VPI/VCI value on a port, and transmits the cell contents on one or more ports, depending on whether the cell is a unicast cell or a multicast cell. For clarity, the present invention is described first in the context of unicast cells. The support for multicast cells is described later. The details of ATM only as may be relevant to the present invention are described here. For a detailed understanding of ATM standard, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith.

The logical processing or flow of the received unicast cells will be explained with reference to FIG. 2. Unicast cells are received on input ports 210-A, 210-B and 210-C, collectively or individually referred by numeral 210 as will be clear from the context. The received cells are buffered in memory 250. A scheduler schedules the buffered cells for transmission on output ports 230-A, 230-B or 230-C, collectively or individually referred to by numeral 230.

The cells received on each unicast connection are buffered in a corresponding queue. Each queue typically buffers cells corresponding to a single connection. However, a queue can buffer a group of unicast connections also. Connections may be grouped into a single queue to, for example, provide an desired aggregate bandwidth to the connections. Queues 220-A through 220-Z shown in FIG. 2 are individually or collectively referred to by numeral 220. The representation of queues 220-A usually includes information to indicate the order ("cell order") in which cells for the corresponding connection are received.

Storing cells received on different connections in different queues enables the scheduler to process different connections differently and to provide different features to different connections according to the corresponding QoS parameters. As a result of such different processing, the cell order may not be the same as transmission order when cells from several connections are considered in the aggregate. However, the cell order and the transmission order are maintained the same for the cells of a given connection (branch).

While awaiting the turn for transmission, the cells of each unicast connection occupy memory space in memory 250. The amount of memory space used by each connection typically depends on the number of cells received on the connection and awaiting transmission. As should be appreciated, a backlog in transmitting cells on a few connections can occupy a substantial (or entire) memory 250, leaving very little (or none) memory space to the other connections.

Figure 3:
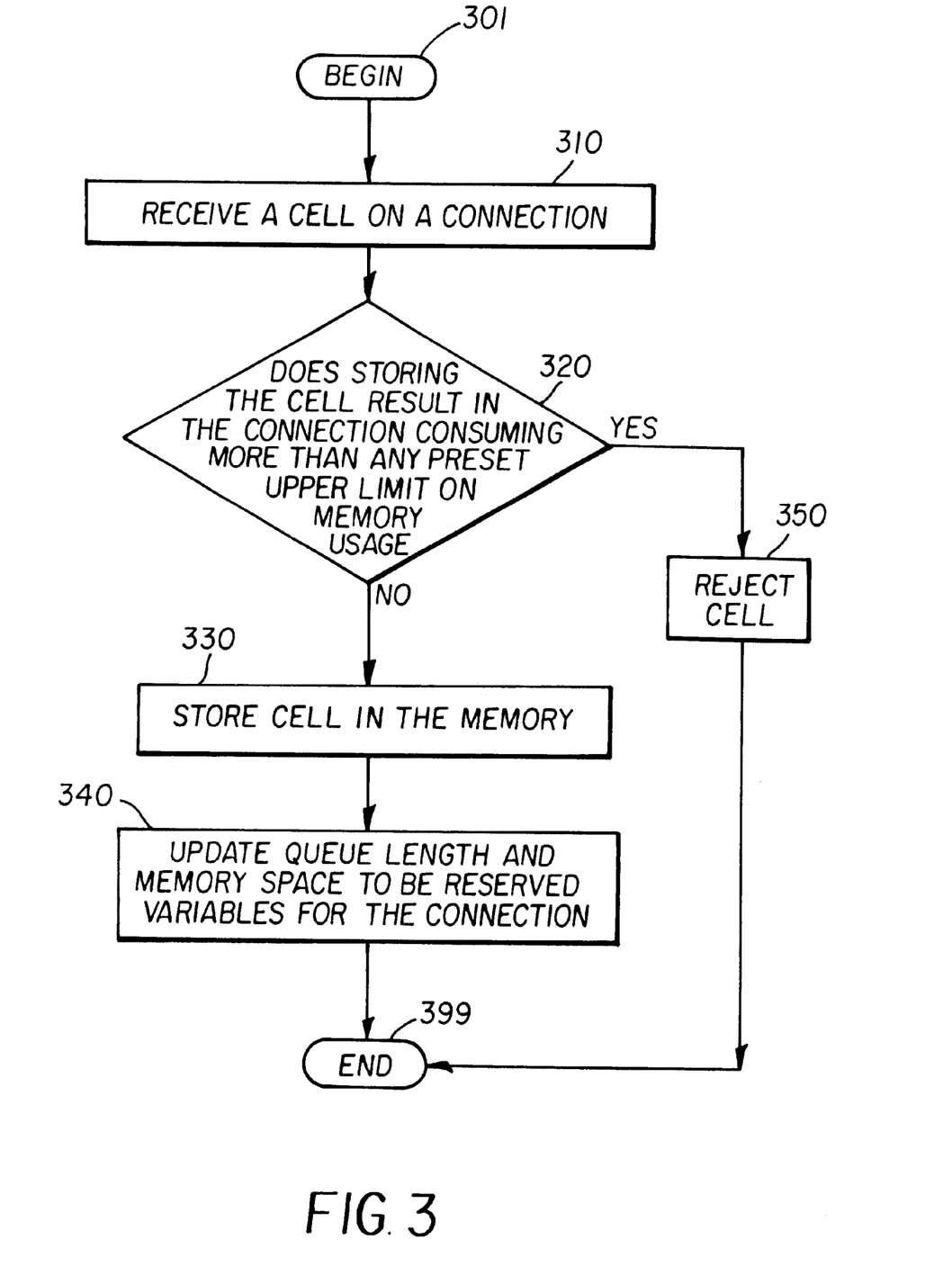
FIG. 3 is a flow chart illustrating a method according to the present invention.

The present invention provides an efficient way to allocate memory space in memory 250 as described below with reference to the flow chart of FIG. 3.

3. Efficient Allocation of Memory for Buffering Cells Received on Unicast Connections FIG. 3 is a flow-chart illustrating a method according to the present invention. In step 310, switch 120 receives a cell on a connection. In step 320, switch 120 determines whether accepting the cell results in the unicast connection consuming more than any preset upper threshold on memory usage. If the connection would use more memory space than the preset upper threshold, the cell is rejected, that is not stored in memory 250.

The upper threshold can be varied dynamically such that the threshold is higher during periods of relatively less congestion and lower during periods of high congestion. In addition, the upper threshold can be dynamically varied to be higher when connections setup with minimum memory space requirement have used (consumed) portions of the corresponding minimum amounts of memory space.

In one embodiment, the upper threshold ($Max_i$) for unicast connection (i) is varied dynamically according to the equation:

$$Max_i = Min_i + \alpha_i(M_{Tot} - \mu_{Tot} - Q_{Tot}) \qquad \text{(Equation 1)}$$

Wherein $Min_i$ represents the desired lower threshold for connection i and can equal zero if no minimum threshold is defined;

$\alpha_i$ is a multiple less than 1;

$M_{Tot}$ is the total amount of memory space available in memory 250;

$\mu_{Tot}$ represents the aggregate memory space which needs to be reserved to ensure that connections have at least a predetermined minimum amount of memory space; and $Q_{Tot}$ is the aggregate memory space used by the connections.

$\mu_{Tot}$ can be computed as follows:

$$\mu_{Tot} = \Sigma \mu_i \qquad \text{(Equation 2)}$$

wherein $\mu_i$ represents the amount of memory space to be reserved for connection i;

$$\mu_i = 0 \text{ if } Q_i >= Min_i, = Min_i - Q_i \text{ if } Q_i < Min_i \qquad \text{(Equation 3)}$$

wherein $Q_i$ is the memory space used by a colmection (i) (or queue i).

α values can be varied to ensure that each unicast connection will have at least the corresponding desired minimum memory space available as will be apparent to one skilled in the relevant arts. $\alpha_i$ can be equal for all connections. In the alternative, for some connections requiring relatively more bandwidth during periods of less congestion (when less cells are stored in switch 120), $\alpha_i$ can be larger.

In step 330, switch 120 stores the cell in the memory if the connection would not use more memory space than the upper threshold $Max_i$. In an embodiment, once stored in memory 250, the cells are candidates for transmission even during periods of severe congestion. That is, a cell is not discarded due to congestion, once placed in memory 250. In step 340, queue length $Q_i$ is incremented to reflect the additional memory space used by a connection due to the storage operation of step 330. The $\mu$ values are also updated according to the equations of above.

Thus, the present invention reserves only as much memory space as required to ensure that a predetermined minimum amount of memory space is available for the desired connections (or queues 220). When the actually used memory space equals or exceeds the corresponding desired minimum space, no additional space is reserved for the connection.

As only an amount of memory space required to guarantee a desired minimum memory space is reserved for the connections, the memory space in memory 250 is utilized efficiently. In combination, the upper threshold ($Max_i$) can be dynamically varied depending on the actual aggregate use of the memory space and the amount of memory space that needs to be reserved for guaranteeing minimum memory space for connections.

By reserving only the memory space required for guaranteeing a desired minimum amount of memory space for connections, and by dynamically varying the upper thresholds on memory space that can be used by connection, the present invention provides an efficient way to share memory space among several connections supported by a switch.

Several aspects of the present invention are described below in further detail with reference to an example implementation. However, it should be understood that several other implementations will be apparent to one skilled in the relevant arts by reading the description herein. Such other implementations are within the scope and spirit of the present invention.

Figure 4:
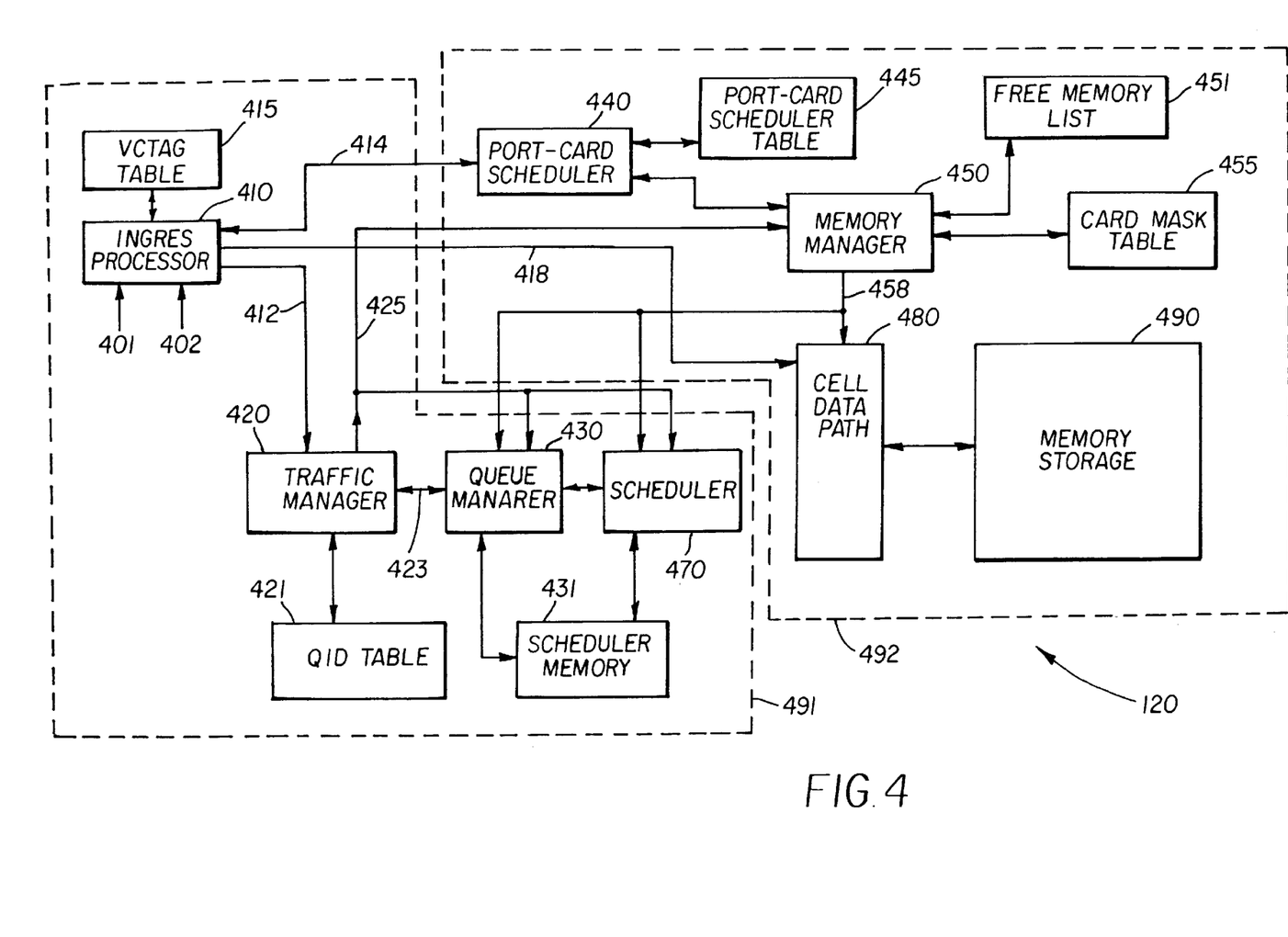
FIG. 4 is a block diagram illustrating an example implementation of a cell switch in accordance with the present invention.

3. Example Implementation of an ATM Switch According to the Present Invention FIG. 4 is a block diagram of switch 120 illustrating an embodiment in which the present invention can be implemented. The components of switch 120 can be implemented as a combination of one or more of software, hardware, firmware, and the like as will be apparent to one skilled in the relevant arts based on the description herein.

Switch 120 may include port card 491 and central block 492. Port card 491 includes a few ports, with each port sending and receiving cell data. Switch 120 typically includes several port cards so that several ports are available for connecting to other switches or end-systems. For the architecture of switch 120 to scale to large networks, some of the functions can be implemented at the port cards and some functions can be implemented centrally in central block 492.

In the embodiment(s) described here, ingress processor 410, traffic manager 420, queue manager 430, and scheduler 470 are shown provided within (or dedicated to) port card 491. Port card scheduler 440, memory manager 450, cell data path 480 and memory storage 490 are shown in central block 492. The components in central block 492 coordinate the operation of components in all the port cards. Each component block of switch 120 is explained in detail below.

Ingress processor 410 receives ATM cells according to a pre-specified protocol on lines 401 and 402 from individual ports (not shown). In one embodiment, the cells are received using UTOPIA protocol well known in the industry. According to this protocol, information is received as to which port a corresponding cell is received on. The received port and VPI/VCI information in a cell are used to identify the input multicast connection. The input multicast connection is identified by its VCTAG. VCTAG table 415 stores the information necessary for determining the VCTAG for a received cell based on VPI/VCI and port information. When a new connection is opened, ingress processor 410 updates the information in VCTAG table 415. Ingress processor 410 determines the VCTAG corresponding to each received cell by examining VCTAG table 415.

Ingress processor 410 transmits the VCTAG information to traffic manager 420 on bus 412 when scheduled to do so by port card scheduler 440. Such scheduling is usually necessary because ingress processor 410 may broadcast VCTAG information to all traffic managers in switch 120, and the bus used for the broadcast may be shared by all ingress processors. In addition, the frequency of examining a port card is dependent on the aggregate bandwidth configured for the port card. The bandwidth information is stored in port card scheduling table 445. Port card scheduling table 445 may include information necessary for egress processing as well. Thus, based on the data in port card scheduling table 445, ingress processor processes the data received on lines 401 and 402. Ingress processor 410 transmits cell data (including header and payload) to data path 480 on bus 418.

Traffic manager 420 receives the VCTAG information on bus 412 and translates the VCTAG into a QID (queue identifier) by examining QID table 421. QID table 421 stores information corresponding to only the queues served by port card 491. QID uniquely identifies the physical queues maintained by switch 120. In one embodiment, VCTAG is represented by more number of bits than QID, and each VCTAG is mapped to a unique QID.

Traffic manager 420 can determine whether to accept (or reject) cells as described with reference to steps 320 and 350 of FIG. 3. In one embodiment, traffic manager 420 uses the numbers computed in accordance with Equations 1, 2 and 3 to determine whether to accept or reject the received cell. Specifically, traffic manager 420 receives a number representative of the term $\alpha_i$ ($M_{Tot}-\mu_{Tot}-Q_{Tot}$) of Equation 1 from memory manager 450, and determines whether the memory space used by a connection would be more than any upper limit for memory usage for the connection. That is, traffic manager 420 determines whether $Q_i > Max_i$ (wherein '>' represents the 'greater than' relationship). If $Q_i > Max_i$ with the acceptance of the received cell, the received cell is rejected.

Upon a determination to accept a cell, traffic manager 420 sends an indication of acceptance (or rejection) to memory manager 450 and queue manager 430 on bus 425. The indication of acceptance is used by memory manager 450 to allocate any new memory locations for buffering the received cell and to update $\mu_{Tot}$. In one embodiment, two signal lines (namely valid line and reject line) are used to communicate acceptance and rejections. Traffic manager 420 asserts the valid line to indicate that the received cell is a candidate for transmission on at least one of the output ports. The reject line is asserted to indicate that the corresponding cell has been rejected. Acceptance is indicated by the absence of assertion of the reject line in combination with the assertion of the valid line. When the valid line is not asserted, it implies that the received cell is not a candidate for transmission on any output port of port card 491. It must be understood that the manner in which various signals (acceptance, reject, etc.) are sent is described here for illustration only. Other ways of implementing these signals will be apparent to one skilled in the relevant arts an such other ways are within the scope and spirit of the present invention.

Figure 2:
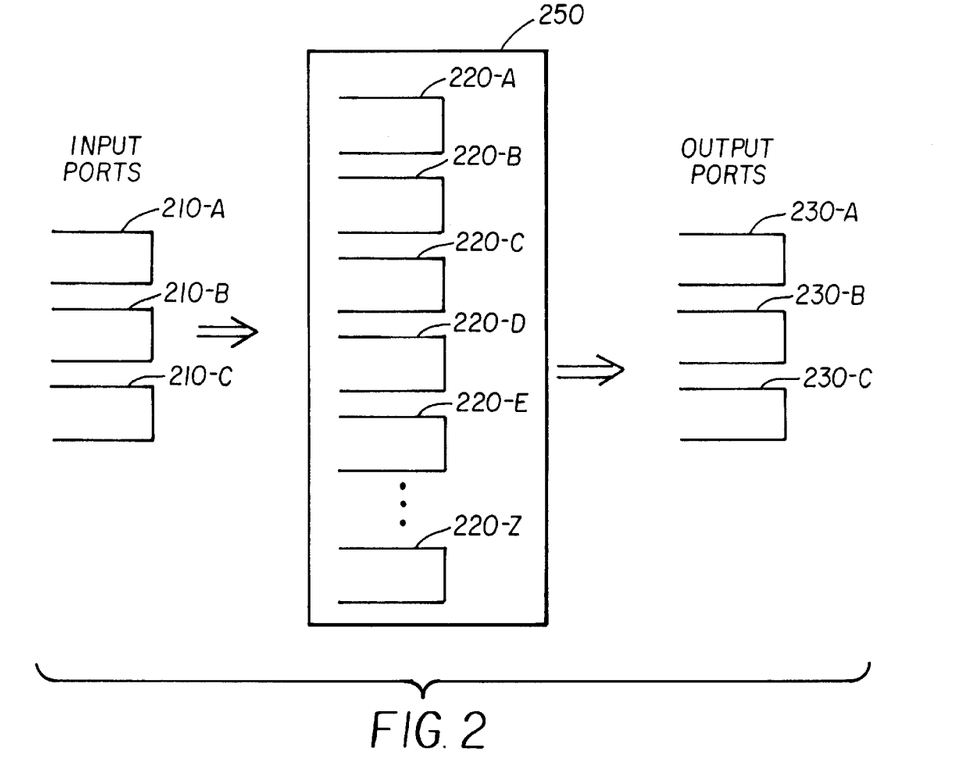
FIG. 2 is a diagram illustrating the general flow of cells in a switch.

Memory storage 490 is used to store cell data and may correspond to memory 250 of FIG. 2. In one embodiment, memory storage 490 is implemented using a sync SRAM, with each memory word being capable of storing one cell. Cell data path 480 stores and retrieves the cell data in memory storage 490. The address of a cell, where a received cell data is to be stored, is provided by memory manager 450. Cell data path 480 provides other input/output functions such as retrieving the cells in advance so that the data is available when scheduled for transmission on individual ports.

Queue manager 430 maintains the information necessary for identifying the locations where cell data of a connection is stored and the corresponding cell order. Queue manager 430 stores the information in scheduler memory 431. An embodiment of queue manager 430 is described in detail in RELATED APPLICATION 1, which is incorporated in its entirety herewith.

Scheduler 470 accesses the information in scheduler memory 431 to schedule the cells buffered in memory storage 490 for transmission. An embodiment of scheduler 470 is described in detail in Related Application 2, which is incorporated in its entirety herewith. Once scheduled for transmission, scheduler 470 sends a signal indicating that the cell Memory manager 450 keeps track of the free locations available for storing the received cells. Free-list memory 451 is used to store the necessary information. In one embodiment, the free-list is maintained as a linked list. A head pointer and a tail pointer are maintained, with the tail pointer being updated each time a free location is added and the head pointer being updated when a free location is provided for storage of a newly arrived cell. Memory manager 450 determines an address for storing newly arriving cells if an acceptance signal is received from any traffic manager 420. The address is used by cell data path 490 to store the cell data, by queue manager 430 to maintain queues, and by scheduler 470 to schedule cells in each of the queues.

While allocating and deallocating memory locations (space) for cells, memory manager 450 provides the value of the term ($M_{Tot} - \mu_{Tot} - Q_{Tot}$) of Equation 1 to each traffic manager 420. As should be clear $\mu_{Tot}$ represents the aggregate reserved memory space, $Q_{tot}$ represents the aggregate used space, the sum of $\mu_{Tot}$ and $Q_{tot}$ represents the total allocated memory space, and the term ($M_{Tot} - \mu_{Tot} - Q_{tot}$) represents the unallocated memory space.

In one embodiment, the value is provided to traffic managers periodically. For example, the value can be updated every eight cell transmission unit cycles A cell transmission unit typically refers to a turn allocated to a port card for transmission of a cell. Port cards are provided turns typically proportionate to the aggregate bandwidth they serve. By providing the value update only once every few cycles, there may be a time lag between the time the value of ($M_{Tot} - \mu_{Tot} - Q_{Tot}$) changes and the time it is provided to a port card. However, the transfer requirements are minimized by not providing the value every cycle. In an alternative embodiment, the value is updated every time the value changes. In this embodiment, consistency is maintained in the global view of the state of the memory space, and memory management may be performed accurately. However, the data transfer requirements are much higher in this embodiment.

As to the value of the term ($M_{Tot} - \mu_{Tot} - Q_{Tot}$), it is noted that $M_{Tot}$ may be readily available either from user configuration or automatic detection (e.g., plug-and-play features known in the art) as $M_{Tot}$ represents the total memory in memory storage 490. $Q_{Tot}$ represents the total memory space presently used by all connections. As the allocation and deallocation of memory location is controlled centrally by memory manager 450, $Q_{Tot}$ also can be readily maintained within memory manager 450.

The computation a lot can pose challenges because of the large number of connections supported by switch 120. In one embodiment, traffic manager provides memory manager 450 the connection identifier (QID and/or VCTAG) along with an indication of acceptance or rejection of each cell, and memory manager 450 maintains $\mu_i$ for each connection. Unfortunately, such an implementation may not scale well to large switches due to the centralization of computations and storage (for $\mu_i$). Accordingly, a distributed scheme for computing $\mu_{Tot}$ is described below. This distributed scheme may scale well to switches supporting a large number of ports, port cards and/or connections.

4. Computing $\mu_{Tot}$

As noted above, $\mu_{Tot}$ can be computed as follows:

$$\mu_{Tot} = \Sigma \mu_1 \qquad \text{(Equation 2)}$$

wherein $\mu_i$ represents the amount of memory space to be reserved for connection i;

$$\mu_i = 0 \text{ if } Q_i \geq \text{Min}_i, = \text{Min}_i - Q_i \text{ if } Q_i < \text{Min}_i \qquad \text{(Equation 3)}$$

wherein $Q_i$ is the memory space used by a connection (i) (or queue i).

To minimize central processing and storage requirements (in central block 492), traffic manager 420 computes $\mu_i$ locally for each connection (i). As the value of $\mu_i$ increases or decreases only by 1 (depending on acceptance and completion of transmission), traffic manager 420 asserts a signal line to cause memory manager 450 to change $\mu_{Tot}$ correspondingly. That is, traffic manager 420 sends only an increase or decrease signal, relieving memory manager 420 of the need to compute and store lii values for all connections. In response, memory manager 420 increments or decrements uTol correspondingly and provides the update to other traffic managers also.

From Equation 3, it may be appreciated that traffic manager 420 needs to maintain queue length $Q_i$ for each unicast connection. $Q_i$ is incremented upon acceptance of a cell and decremented upon transmission. $\text{Min}_i$ is usually configured during connection setup time based on QoS parameters. Once a connection (j) is opened with a request for a minimum amount of memory space $\text{Min}_j$, $\mu_{Tot}$ needs to be increased by $\text{Min}_j$.

When a cell received on a unicast connection (i) is accepted, traffic manager 420 determines whether $Q_i$ is >= $\text{Min}_i$. If $Q_i$ is >= $\text{Min}_i$, the reservation required for connection (i) $\mu_i$ and the aggregate reservation $\mu_{Tot}$ need not be changed. Accordingly, traffic manager 420 does not cause any change in $\mu_i$ and $\mu_{Tot}$. On the other hand, if $Q_i < \text{Min}_i$, traffic manager 420 decreases $\mu_i$ and asserts a signal to cause memory manager 450 to decrease $\mu_{Tot}$ as queue (i) for unicast connection (i) would be using an additional memory location for buffering the accepted cell. It should be noted that $Q_i$ and $Q_{Tot}$ are typically incremented upon acceptance of a cell, while $\mu_{Tot}$ may not be necessarily decremented. It may be further noted that due to increment and decrement signals, a counter need not be maintained for $\mu_i$.

When a cell of a unicast connection (i) is transmitted and cell location in memory storage 490 is cleared, reservation variables ($\mu_i$ and $\mu_{Tot}$) need to be increased if queue length $Q_i$ is less than $Min_i$. Thus, upon completion of transmission of a unicast cell, $Q_i$ is incremented by one and a determination is made whether $Q_i$<$Min_i$. If $Q_i$ is determined to be less than $Min_i$, traffic manager 420 asserts a signal to cause memory manager 450 to increment $\mu_{Tot}$.

Thus, based on the increase and decrease signals from various traffic managers, memory manager 450 can maintain (or compute) $\mu_{Tot}$ and $Q_{Tot}$. In turn, $\mu_{Tot}$ and $Q_{tot}$ are used to compute ($M_{Tot}$-$\mu_{Tot}$-$Q_{Tot}$) and passed to all the traffic managers. The traffic managers receive the computed value to determine whether to accept or reject a cell.

The manner in which $\mu_{Tot}$ can be computed in the context of unicast connections has been described above. The description below describes the manner in which cells received on multicast connections can be processed.

5. Processing Cells Received on Multicast Connections

As noted above, multicasting typically refers to the ability of one end-station (source end station) to send a cell to several end-stations (target end-stations) without the source end-station having to retransmit the cell to the individual target end stations. Thus, a multicast connection may be viewed as a tree having several output branches corresponding to a single root or source. To process cells received on a multicast connection, a switch usually needs to transmit each received cell on several ports.

In one embodiment (described with reference to FIG. 2), several copies of the cell may be maintained in memory 250, with each copy being placed in queue 220. In other words, a copy is maintained for each branch of the multicast connection. In such a situation, $\mu_{Tot}$ can be maintained and computed using the signals described above with each branch being treated as a unicast connection.

Unfortunately, maintaining a copy for each branch consumes excessive memory space in memory 250 (or memory storage 490). A method and apparatus for processing multicast cells while maintaining a single copy of the cell data in memory 250 is described in detail in Related Application 1, which is incorporated in its entirety herewith. The scheme, as relevant to understanding the making and using of the present invention, is described below.

Continuing with reference to FIG. 4, ingress processor 410 determines the VCTAG information for each received cell and broadcasts the information to all traffic managers in switch 120. Each traffic manager 420 examines the QID table 421 to determine the existence of the received VCTAG. If the VCTAG exists, an associated port mask and QID is also received from QID table. The existence of VCTAG implies that the received cell needs to be transmitted from at least one of the output ports on the port card.

The port mask indicates the specific ports on port card 491 on which the cell needs to be transmitted. For multicast cells, the cell may need to be transmitted on more than one output port in port card 491. Transmission on each port corresponds to a branch of the multicast connection. To accomplish the transmission, traffic manager 420 (in conjunction with queue manager 430) stores the mask associated with an accepted cell.

Traffic manager 420 can determine whether to accept the received multicast cell. It should be understood that switch 120 can have several traffic managers (one for each port card), and each traffic manager can make an independent decision on whether to accept or reject a cell. In one embodiment, traffic manager 420 can accept the cell for all branches indicated by the retrieved port-mask, for only some of the branches or reject the cell altogether. If traffic manager 420 decides to accept the received cell for only some of the branches indicated by the port mask, the port mask (stored in scheduler memory 431) associated with the cell needs to be changed indicating the ports on which the cell needs to be transmitted (or accepted). If a cell is accepted for all ports indicated by the retrieved port mask, the same value can be saved in scheduler memory 431. The manner in which the port mask stored in scheduler memory 431 is used for multicasting is described below and in Related Application 1.

In an alternative embodiment, traffic manager 420 accepts or rejects a cell for all ports indicated by the port mask retrieved from QID table for simplicity of implementation. By defining $Q_i$ equal to the length of the longest branch served by port card, the memory space and computational requirements are minimized. On the other hand, flexibility may be lost in managing the maximum and minimum thresholds for queues associated with each port. However, the $\mu$ updates can be simplified as described below. The scheme for updating $\mu$ will be clearer with an understanding of the manner in which a single copy in memory storage 490 is used for multicasting. The scheme in an embodiment is described briefly below with reference to FIG. 5. For additional details, the reader is referred to Related Application 1 and Related Application 2.

6. Providing Multicast Capability Using a Single Copy of the Cell Data

Broadly, traffic manager 420 provides to queue manager 430 a port mask for each accepted cell. Queue manager 430 receives from memory manager 480 an address in memory storage 490 where an accepted cell is stored. Queue manager 430 maintains the data structures necessary to identify the cell order. In one embodiment queue manager 430 maintains the cell order using a linked list. The tail pointer is updated as a new cell is accepted.

However, multiple head pointers are provided, with each head pointer identifying the next cell (in the cell order) to be transmitted on a corresponding output port. Scheduler 470 traverses each head pointer independently to transmit the cells on a corresponding port. By traversing the head pointers corresponding to the output ports, scheduler 470 provides the multicasting capability. Each head pointer along with the data structures defining the linked list (tail pointer and pointers defining the cell order) may be viewed as a logical queue based on one physical queue stored in memory storage 490. With reference to FIG. 2, each logical queue corresponds to one of the queues 220. Accordingly, each queue 220 may be termed as a branch queue. In case of a unicast connection, a branch queue may be termed as a connection queue.

An example scheme including data structures (stored in scheduler memory 431) used by queue manager 430 and scheduler 470 is described with reference to FIG. 5. Physical queue pointer table 510 is shown with pointer locations 510-A through 510-L for illustration purpose. In reality, physical queue pointers 520 typically include a number of locations equal to the number of cells that may be stored in memory 490. The pointers in physical queue pointers 520 identify the cells stored in memory 490 and the order (cell order) in which they are received. This is illustrated with an example in FIG. 5, in which storage locations 520-A through 520-L represent memory locations in memory 490 where cell data is stored. Location 510-A points to location 510-C, which in turn points to 510-D, which points to location 510-L, which points to location 510-H. Thus, the cell data stored in corresponding memory storage locations 520-A, 520-C, 520-D, 520-L and 510-H form a sequence of cells received (in that order) on a multicast connection. The sequence of these stored cells forms a physical queue.

Several logical queues are defined based on the stored physical queue. Each logical queue corresponds to an output branch of the desired multicast connection. As will be readily appreciated, the cell data need not be duplicated for each logical queue, and memory savings may be achieved. Each logical queue is processed to transmit cells on an output branch. Multicasting is achieved by transmissions of cells on all such output branches.

A logical queue is defined by a head-pointer and a tail-pointer to the stored physical queue. All the logical queues based on a single physical queue can share a single tail-pointer, which will require the updating of only a single pointer on the addition of a new cell received on a multicast connection. The tail pointer identifies the storage location of the last cell received on a connection. Compared to a scheme in which a tail pointer is maintained for each branch, considerably less processing steps may be performed by switch 120 when a multicast cell is added in a shared tail-pointer based scheme. Accordingly, switch 120 may have a high throughput performance. In addition, the memory requirements are also minimized because of the sharing of the tail pointer.

As each logical queue is traversed (by scheduler 470) in the cell order, the head-pointer corresponding to that logical queue is updated to reflect the processed cells for that branch. Thus, a head pointer for a logical queue points to the next cell to be processed in the cell order for that logical queue (branch).

Figure 5:
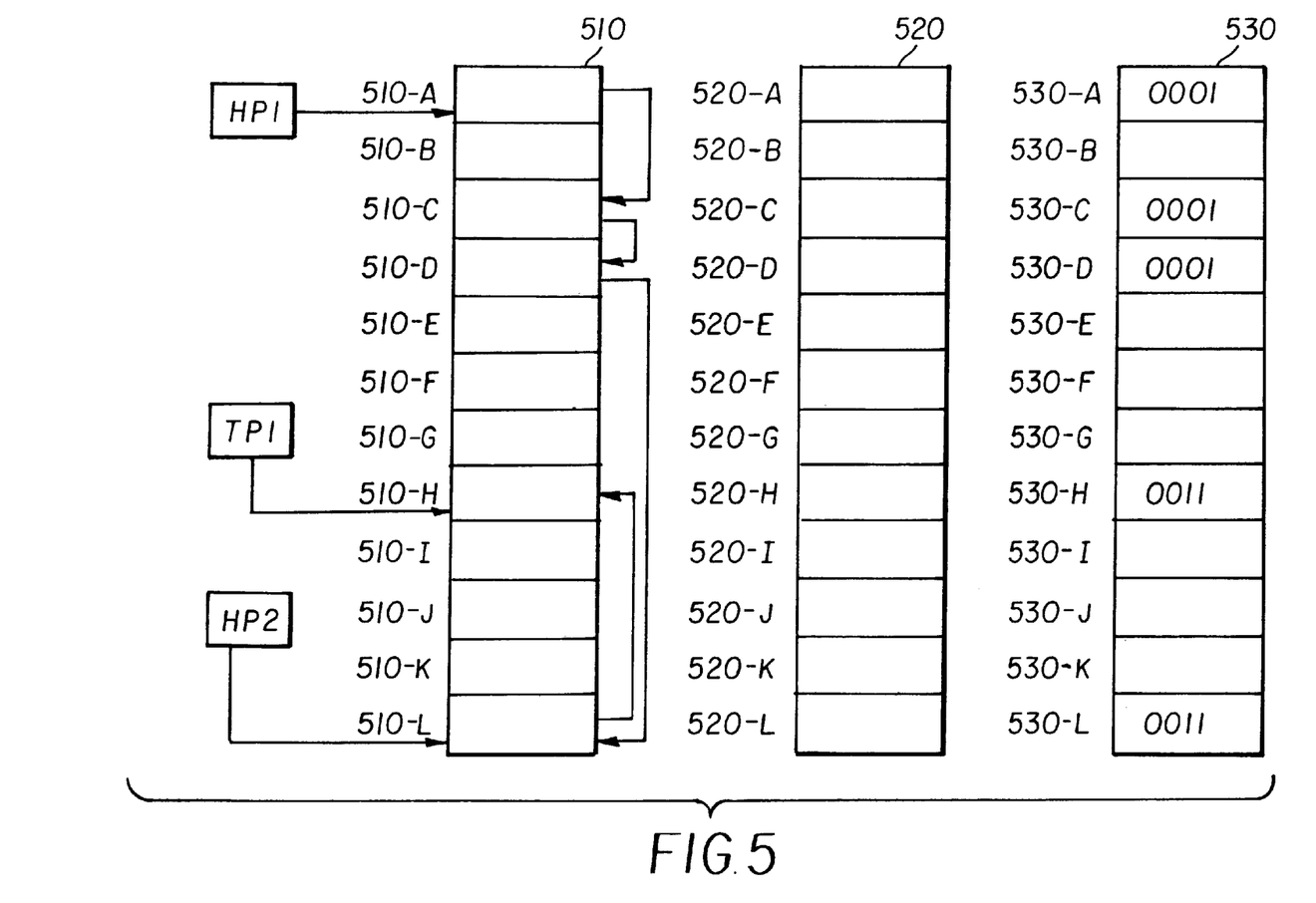
FIG. 5 is a block diagram of the data structures used by an embodiment of the present invention to maintain and process several logical queues based on a physical queue, with each logical queue corresponding to one of several output branches forming a multicast transmission.

As an illustration, FIG. 5 illustrates the manner in which packets received on a multicast connection are stored and processed. The multicast connection has two output branches (1 and 2) defined by head-pointers 1 and 2 (HP1 and HP2) respectively. The two branches share tail pointer TP1. Each logical queue (branch) can be processed independent of other logical queues. To schedule packets on a logical queue for transmission, scheduler 470 traverses the linked list using the corresponding head pointer, and schedules each traversed cell for transmission. In FIG. 5, the cells corresponding to logical queue 2 are processed at a higher speed, and accordingly head pointer 2 points to a later cell (510-L) in the cell order. The processing of logical queue 1 is behind by three cells (510-A, 510-C, and 510-D) in this illustration.

A tail pointer is defined for each physical queue and is shared by all logical queues corresponding to the same connection. Thus, tail pointer 1 (TP 1) identifies the last cell stored for the physical queue. For simplicity, only one physical queue is shown in FIG. 5. Typically, up to several thousands of connections can be maintained by queue manager. When a new cell is added, for example, in storage location 520-F, pointer 510-H points to 510-F, and tail pointer 1 points to 510-F.

Port-mask table 530 is used to identify the branches on which each cell in a physical queue is to be transmitted. In one embodiment, each port can have only one branch of a multicast connection associated with it. Accordingly, port-mask table 530 identifies the ports on which the corresponding cell is yet to be transmitted. Thus, with reference to the queues illustrated in FIG. 5, assuming that branches 1 and 2 are to be transmitted on ports 1 and 2 respectively, port masks 530-A, 530-C and 530-D are shown with a mask of 0001 indicating that corresponding cells 520-A, 520-C and 520-D are to be transmitted on port 1 only (i.e., output branch 1). On the other hand, the port masks 530-H and 530-L have a value of 0011 indicating that the corresponding cells are to be transmitted on ports 1 and 2 respectively.

As a cell is transmitted on a port, scheduler 470 updates the corresponding port mask entry to reflect that the cell does not need to be transmitted on that port. Once all the entries of a port-mask equal zero, the corresponding cell data is no longer needed by the corresponding port card. Accordingly, queue manager 430 provides an indication to memory manager 450 of completion of transmission of the corresponding multicast cell. Upon receiving similar indication from all queue managers in switch 120, memory manager 450 makes the corresponding storage location available for newly arriving cells.

The update operation of the $\mu_i$ and $\mu_{Tot}$ variables is described below in the context of the above-described scheme. The update operation can depend on whether a received multicast cell is accepted for all branches or not. First, the update of $\mu$ variables is described assuming all traffic managers accept a cell. Then, $\mu$ updates are described when only some of the traffic managers accept a multicast cell.

7. Updating $\mu_{Tot}$ and $Q_{Tot}$ When All Traffic Managers Accept a Multicast Cell In view of the above description, it should be noted that only a single copy of a multicast cell is stored in memory storage 490 shared by several connections on all port cards. Therefore, $Q_i$ (on a port card) and $Q_{Tot}$ (in the central memory manager) need to be updated only once for each multicast cell irrespective of the number of branches. The operation of the components of switch 120 to update the variables is described below.

Each traffic manager 420 sends an acceptance signal to memory manager 450 for a received multicast cell upon the acceptance of a received cell. Traffic manager 420 may send a $\mu$-decrease signal when the longest branch queue uses less than the minimum threshold for the multicast connection. In response to receiving acceptance signals, memory manager 450 increases $Q_{Tot}$ by one as memory needs to be allocated to the newly received cell.

Traffic manager 420 may send a $\mu$-decrement signal if $Q_i$ is less than $Min_i$. $Q_i$ in a multicast scenario may be defined as the length of the longest branch served by the corresponding port card. $Min_i$ is preferably equal for all branches, but may be different for different branches. In response to receiving a $\mu$-decrement signal, memory manager 450 may decrement $\mu_{Tot}$ if no reject signal is received from any port card.

$\mu_{Tot}$ may need to be incremented as a part of processing a multicast cell depending on the length of the queue corresponding to longest branch as noted above. Each traffic manager 420 sends a $\mu$-increment signal upon the completion of transmission of a multicast cell on all branches served by the corresponding port card. As may be readily apparent to one skilled in the relevant arts, transmissions on different branches can occur at different times depending on factors such congestion levels and available bandwidths on the individual ports. Accordingly, the $\mu$-decrement signals may be distributed over a short-duration of time.

In response to the $\mu$-increment signals, traffic manager 420 needs to increase $\mu_{Tot}$ once. Incrementing $\mu_{Tot}$ on the reception of the first $\mu$-increment signal (assume "first embodiment") or on the reception of the last $\mu$-increment signal ("alternative embodiment") can lead to different results. For example, more memory may be reserved for multicast connections in the first embodiment as the reservation is based on a branch being served fastest among the several branches of the multicast connection. In turn, this may enhance the probability that a desired minimum memory space (Min$_i$) is available for a multicast connection irrespective of the presence of a slow branch.

To implement the above-noted schemes of $\mu$-updates, memory manager 450 may maintain information identifying all traffic managers (in switch 120), which have indicated acceptance of a received multicast cell. This information may be stored as a card mask for each multicast cell in port card mask table 455. Memory manager 450 sets the card mask to indicate all the traffic managers which have sent an acceptance signal.

As described above, once scheduler 470 in port card 492 traverses all the logical queues and transmits a multicast cell on all the desired output ports, traffic manager 420 sends a completion signal to memory manager 450. In addition, traffic manager 420 sends a $\mu$-increment signal if the longest branch queue on the corresponding port card uses less than the minimum threshold Min$_i$ for the multicast connection.

In response to the completion signal, memory manager 450 updates the associated card mask stored in card mask table 455 to indicate that port card 492 does not need the corresponding cell data any more. Once all the port cards indicated by the card mask send a completion signal (message), memory manager 450 updates the free-list memory 451 to indicate the availability of the memory location storing that given cell. In the case of a linked list implementation, the freed location is added to the tail of the free memory list.

As the memory space is freed, memory manager 450 increases $Q_{Tot}$. $\mu_{Tot}$ (if needed) can be incremented, at least according to one of the schemes noted above. In case $\mu_{Tot}$ is incremented in response to receiving the first $\mu$-increment command, a $\mu$-incremented bit can be maintained associated with each cell, which indicates that the $\mu_{Tot}$ has been incremented corresponding to the cell. When the $\mu$-incremented bit indicates that the $\mu_{Tot}$ has already been incremented, the any subsequently received $\mu$-increment signals are ignored.

In case $\mu_{Tot}$ is incremented after the reception of the last $\mu$-increment signal, $\mu_{Tot}$ can be incremented at the time the memory location is freed. In this embodiment, a $\mu$-needs-to-be-incremented bit can be maintained, which is set upon receiving at least one $\mu$-increment signal. When the last $\mu$-reject signal is received or when the corresponding memory location is freed, $\mu_{Tot}$ can be incremented if the $\mu$-needs-to-be-incremented bit is set.

Therefore, $\mu_{Tot}$ and $Q_{Tot}$ can be computed as described above in a distributed manner when all port cards on which a cell needs to be transmitted accept a newly received multicast cell. However, when at least one of the port cards rejects a multicast cell (e.g., as the Max$_i$ is exceeded), the manner in which $\mu_{Tot}$ is updated can be implemented differently as described below.

8. Reservation of Memory Space for a Multicast Connection When a Cell is Rejected by At least one port card A multicast cell may be rejected by a port card typically because the corresponding queue length $Q_i$>Max$_i$ (that is, a branch served by the port card is sufficiently lagging to cause more than Max$_i$ memory space to be used by the branches served by that port card). As a result, it may be inferred that the multicast connection is consuming more than a desired amount of memory. Accordingly, the reservation ($\mu_i$ and $\mu_{Tot}$) is not decreased upon the arrival of a multicast cell in one embodiment when a rejection signal is received even if a $\mu$-decrease signal is received from one port card (where branches are likely being processed fast).

To ensure that $\mu_{Tot}$ is not incremented in response to a later received $\mu$-increment signal, a cell-rejected bit may need to be maintained which indicates that the cell has been rejected on at least one port card. If this bit is set, any $\mu$-increase signals can be ignored. Thus, reservation is unaffected when a multicast cell is rejected by at least one port card.

One desirable feature is that the amount of data (number of bits) maintained for each cell be minimized. Such a feature enables that switch 120 can handle a larger number of cells, which may be particularly important for switches operating in large congested networks.

According to an aspect of the present invention, a single bit is used to represent the cell-rejected bit and the $\mu$-incremented bit referred to above. When the bit has a first logical value, it can imply either that the cell has been rejected by one of the port cards or that $\mu_{Tot}$ has already been incremented for the cell in response to a first $\mu$-increment signal. Accordingly, when the bit is equal to the first logical value, $\mu$-increment signals can be ignored.

When the bit is equal to a second logical value and $\mu$-increment signal is received, $\mu_{Tot}$ is incremented. Then, the bit is set to the first logical value to prevent further increments to $\mu_{Tot}$ due to completion of transmission of the cell by other port cards. The manner in which memory manager 450 computes and maintains $\mu_{Tot}$ in an embodiment is summarized with reference to FIG. 6.

9. Summary of Maintaining $\mu_{Tot}$

Figure 6:
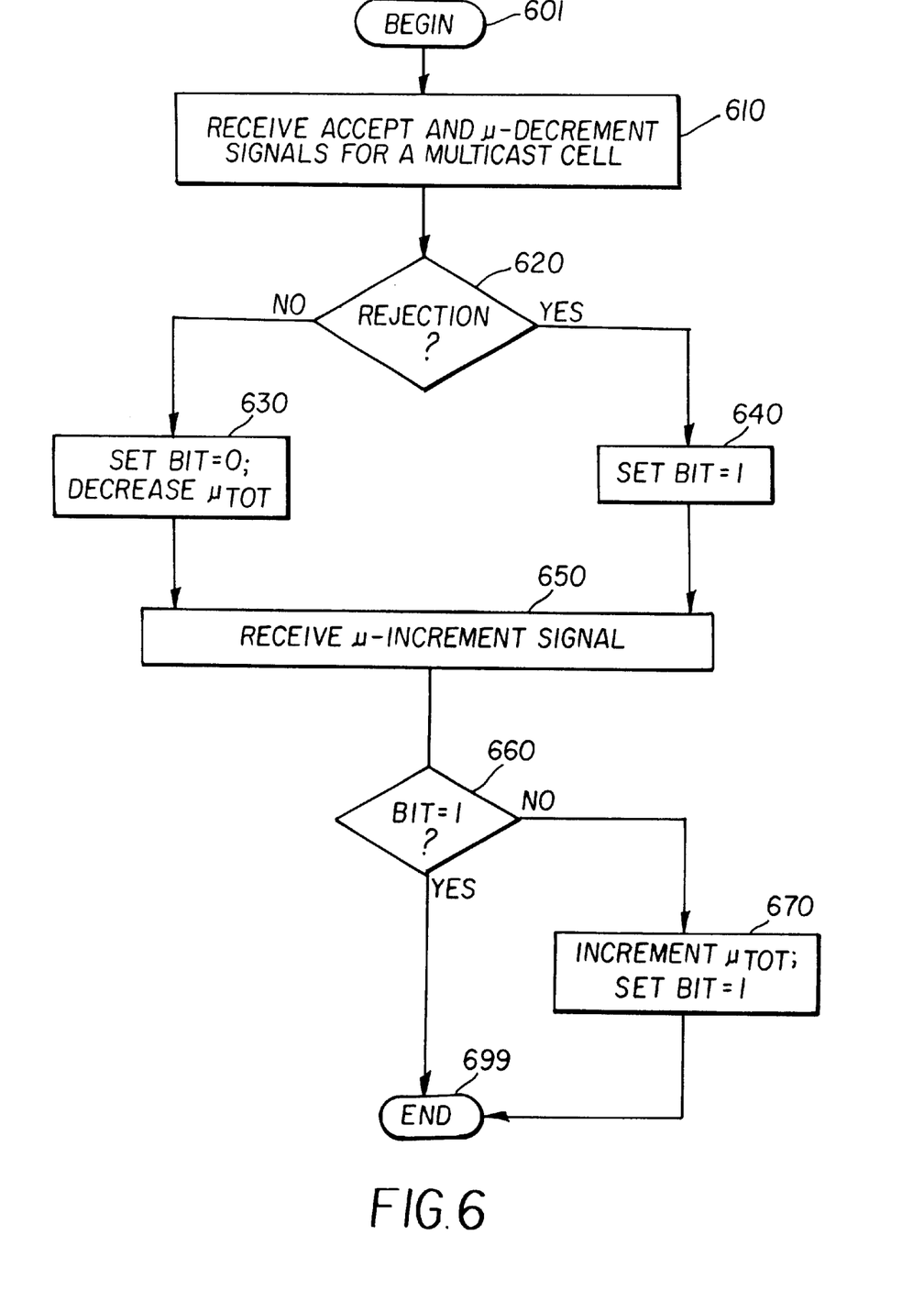
FIG. 6 is a flow chart illustrating a method according to which the amount of memory space to be reserved is computed and maintained.

FIG. 6 is a flow-chart illustrating a method of maintaining $\mu_{Tot}$. In step 610, memory manager 450 receives accept signals and $\mu$-decrement signals from various traffic managers in switch 120. In step 620, memory manager 450 determines whether at least one traffic manager 420 has rejected a cell. If no rejection is present, a bit is set, for example, to 0 and $\mu_{Tot}$ is decremented. A value of 0 for the bit indicates that the $\mu_{Tot}$ needs to be increased if a $\mu$-increment signal is received subsequently. As no memory space is reserved if at least one rejection is present, the bit is set to 1 in step 640.

Upon receiving a $\mu$-increment signal in step 650, the bit is examined in step 660. If the bit has a value of 1, $\mu_{Tot}$ is incremented in step 670 and the bit is set to 0. Accordingly, $\mu_{Tot}$ is not incremented in response to any subsequently received $\mu$-increment signals. Steps 650, 660, and 670 may be performed for each received $\mu$-increment signal.

Therefore, the method of FIG. 6 can be used to maintain $\mu_{Tot}$ while minimizing the additional memory requirements. Using the $\mu_{Tot}$ value, cells can be rejected and accepted to ensure that a minimum memory space is available for any desired connections. Some scenarios where connections may need to be provided such minimum memory space are described below.

10. Example Scenarios in Which Provision of Minimum Bandwidth is Useful

Providing minimum memory space is particularly useful for connections setup with available bit rate (ABR) service.

ABR service generally refers to dynamically changing the bandwidth used by a connection depending on the congestion level in the connection path. ABR service is typically implemented by sending a cell (ABR cell) with specific header parameters, and the ABR cell is transmitted back by the switch at the end of the connection path to the switch which originated the ABR cell. Assuming that the round-trip time provides a measure of the bandwidth available on the connection path, the bandwidth for the connection is adjusted according to the round-trip time of the ABR cell.

To ensure that the ABR cells are transmitted without being dropped, it may be desirable that connections using ABR service are provided at least a minimum amount of memory space.

Another example where it may be desirable to guarantee at least some memory space is for connections which may be setup with continuous bit rate (CBR) service. CBR service is typically used by connections serving applications such as video, which transmit a continuous stream of cells which are interspersed substantially evenly in time. The cells received on such connections are usually processed with low latency.

By ensuring the availability of a minimal memory space for such applications, the present invention prevents other connections from depriving the CBR connections of the share memory space.

The scenarios are described here merely as an illustration. The present invention can be used in several other environments (including local area networks as switch connecting two segments) and different types of applications as will be apparent to one skilled in the relevant arts by reading the description provided herein. In addition, the functions are described as being performed by individual blocks for illustration only. The functions can be implemented among the individual blocks or components depending on available products and technology as will be apparent to one skilled in the relevant arts based on the description herein.

11. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of sharing the memory space in a memory of a switch among a plurality of connections, said memory being used for buffering a plurality of cells awaiting transmission, wherein each of said plurality of cells is received on one of said plurality of connections, said method comprising the steps of:

(a) reserving a portion of said memory space to guarantee a minimum memory space associated with each of said plurality of connections;

(b) receiving a new unicast cell on a first unicast connection included in said plurality of connections;

(c) determining whether storing said new unicast cell in said memory would cause said first unicast connection to use more than an upper threshold of memory space associated with said first unicast connection, wherein each of said plurality of connections has an associated upper threshold of memory space;

(d) rejecting said new unicast cell if storing said new unicast cell in said memory would cause said first unicast connection to use more than said upper threshold of memory space associated with said first unicast connection;

(e) storing said new unicast cell in said memory if storing said new unicast cell in said memory would not cause said first unicast connection to use more than said upper threshold of memory space associated with said first unicast connection;

(f) decreasing said portion of said memory space if said new unicast cell is stored in said memory and if the amount of memory space used by said first unicast connection is less than said minimum memory space associated with said first unicast connection;

(g) increasing said portion of said memory space after said new unicast cell is transmitted if the amount of memory space presently used by said first unicast connection is less than said minimum memory space associated with said first unicast connection;

(h) recomputing sand upper thresholds when said portion of memory is decreased in step (f) or increased in step (g) such that said upper thresholds are higher when less memory space is reserved and are lower when more memory space is reserved, wherein the changes to said upper thresholds according to step (h) and the amount of said portion of memory space reserved enable said memory to be allocated efficiently among said plurality of connections.

2. The method of claim 1, wherein said upper threshold for said first unicast connection is computed according to the equation, $Min_i + \alpha_i (M_{Tot} - \mu_{Tot} - Q_{Tot})$, wherein $Min_j$ represents said minimum memory space for said first unicast connection, $\alpha_i$ is a multiple less than 1, $M_{Tot}$ is the total amount of memory space available in said memory, $\mu_{Tot}$ equals the amount of said portion of said memory space computed according to steps (a), (f) and (g), and $Q_{Tot}$ is the aggregate memory space used by said plurality of connections.

3. The method of claim 1, wherein said switch includes a plurality of port cards, with each port card including a plurality of ports for transmitting and receiving said plurality of cells, wherein steps (f) and (g) comprise the steps of:

(i) maintaining in each of said plurality of port cards a length of queue for each of unicast connections transmitted on a port of corresponding port cards, wherein said length of queue is indicative of the number of cells buffered in said memory for a corresponding unicast connection;

(j) sending a reservation decrement signal from a first port card transmitting cells received on said first unicast connection if the amount of memory space presently used by said first unicast connection is less than said minimum memory space when said new unicast cell is stored in said memory, wherein a memory manager controlling access to said memory decreases the amount of said reserved memory space in response to said reservation decrement signal; and (k) sending a reservation increment signal from said first port card to said memory manager after said new unicast cell is transmitted from said port card if the amount of memory space presently used by said first unicast connection is less than said minimum memory space associated with said first unicast connection, wherein a memory manager increases the amount of said reserved memory space in response to said reservation increment signal.

4. The method of claim 3, further comprising the step of sharing said memory space for buffering a plurality of multicast cells, said method comprising the further steps:

(l) receiving a first multicast cell on a first multicast connection, wherein said first multicast connection is included in said plurality of connections and said first multicast cell is included in said plurality of multicast cells, and wherein said first multicast connection is destined for transmission on a second port card;

(m) determining whether storing said first multicast cell in said memory would cause said first multicast connection to use more than an upper threshold of memory space associated with said first multicast connection;

(n) sending a reject signal from said second port card to said memory manager if storing said first multicast cell in said memory would cause said first multicast connection to use more memory space than said upper threshold of memory space associated with said multicast connection, wherein said reject signal is used in step (d) to reject said new unicast cell such that the same reject signal can be used between said port cards and said memory manager for rejecting multicast cells and unicast cells.

5. The method of claim 4, further comprising the steps of:

(o) receiving an acceptance signal and a reservation decrement signal for said first multicast cell from an another port card; and (p) decrementing said portion of reserved memory space only if a reject signal is not received from any port card in spite of receiving said reservation decrement signal in step (o).

6. The method of claim 5, wherein a reject signal is not received from any port card, said method comprising the steps of:

(q) completing transmission of said first multicast cell on said second port card;

(r) sending a reservation-increment signal from said second port card to said memory storage if the amount of memory space used by said first multicast connection will be less than said associated minimum memory space after completion of transmission of said first multicast cell, wherein said reservation-increment signal is used in (g) when processing said new unicast cell such that the same reservation-increment signal is used for processing multicast cells and unicast cells.

7. The method of claim 6, further comprising the step of:

(s) incrementing said portion of reserved memory in response to reservation-increment signals received from said port cards, wherein said step of incrementing is performed only once for each multicast cell.

8. The method of claim 7, wherein step (s) comprises the steps of:

(t) incrementing said portion of reserved memory in response to a first one of said reservation-increment signals;

(u) maintaining a bit in said memory manager indicating that step (t) has been performed such that said portion of reserved memory space is not incremented in response to subsequently received reservation-increment signals for said first multicast cell.

9. The method of claim 8, further comprising the step of using said bit of step (u) to indicate that a reject signal has been received from one of said port cards, wherein one state of said bit indicates either that said reject signal has been received or said step (t) has been performed, and another state of said bit indicates that the said portion of reserved memory space needs to be incremented in response to a subsequent reception of a reservation-increment signal.

10. The method of claim 7, wherein step (s) comprises the step of incrementing said portion of reserved memory after a last one of said reservation increment signals is received.

11. The method of claim 10, wherein step (s) further comprises of incrementing said portion of reserved memory when deleting said first multicast cell from said memory.

12. The method of claim 1, wherein said steps are implemented in an asynchronous transfer mode (ATM) switch.

13. A switch providing for efficient sharing of the memory space in a memory among a plurality of connections, said memory being used for buffering a plurality of cells awaiting transmission, wherein each of said plurality of cells is received on one of said plurality of connections, said switch comprising:

reservation means for reserving a portion of said memory space to guarantee a minimum memory space associated with each of said plurality of connections;

receiving means for receiving a new unicast cell on a first unicast connection included in said plurality of connections;

determination means for determining whether storing said new unicast cell in said memory would cause said first unicast connection to use more than an upper threshold of memory space associated with said first unicast connection, wherein each of said plurality of connections has a corresponding upper threshold of memory space;

rejection means for rejecting said new unicast cell if storing said new unicast cell in said memory would cause said first unicast connection to use more than said upper threshold of memory space associated with said first unicast connection;

storage means for storing said new unicast cell in said memory if storing said new unicast cell in said memory would not cause said first unicast connection to use more than said upper threshold of memory space associated with said first unicast connection;

decrementing means for decrementing said portion of said memory space if said new unicast cell is stored in said memory and if the amount of memory space presently used by said first unicast connection is less than said minimum memory space associated with said first unicast connection;

incrementing means for incrementing said portion of said memory space after said new unicast cell is transmitted if the amount of memory space presently used by said first unicast connection is less than said minimum memory space associated with said first unicast connection;

computation means for recomputing upper thresholds when said portion of memory is decreased or increased such that said upper thresholds are higher when less memory space is reserved and are lower when more memory space is reserved, wherein the changes to said upper thresholds and the amount of said portion of memory space reserved enable said memory to be allocated efficiently among said plurality of connections.

14. A switch providing for efficient sharing of memory space in a memory among a plurality of connections, said memory being used for buffering a plurality of cells awaiting transmission, wherein each of said plurality of cells is received on one of said plurality of connections, said switch comprising:

a plurality of port cards for sending and receiving said plurality of cells on said plurality of connections, each of said plurality of port cards comprising:

a plurality of ports for receiving and sending said plurality of cells;

a traffic manager coupled to said plurality of ports for receiving a new cell on a first connection, wherein said new cell and said first connection are included in said plurality of cells and said plurality of connections respectively, said traffic manager being designed to determine whether storing said new cell in said memory would cause said first connection to use more than an upper threshold of memory space associated with said first connection, wherein each of said plurality of connections has an associated upper threshold of memory space, said traffic manager rejecting said new cell if storing said new cell in said memory would cause said first connection to use more than said upper threshold of memory space associated with said first connection and sending an acceptance signal otherwise, said traffic manager for receiving a number representing an amount of total memory allocated in said memory for said plurality of connections, said traffic manager recomputing said upper threshold to be higher when said number is bigger and lower when said number is smaller, said traffic manager being designed to determine if the amount of memory space used by said first connection is less than a minimum memory space associated with said first connection and to send a reservation decrement signal if the amount of memory space used by said connection is determined to be less than said associated minimum memory space, said traffic manager being designed to determine if the amount of memory space used by said first connection is less than said associated minimum memory space upon completion of transmission of said new cell, said traffic manager for sending a reservation increment signal if the amount of memory space used by said connection is determined to be more than said associated minimum memory space; and a memory manager coupled to said plurality of port cards, said memory manager for receiving said acceptance signal, said reservation increment signal and said reservation decrement signal, said memory manager reserving a portion of said memory space to guarantee said minimum memory spaces associated with said plurality of connections, said memory manager storing said new cell in said memory upon receiving said acceptance signal, said memory manager incrementing said portion of said memory in response to receiving said reservation increment signal and decrementing said portion of said memory in response to said reservation decrement signal, said memory manager for computing the total amount of memory used for storing said plurality of cells received on said plurality of connections, said memory manager reserving a portion of said memory to provide any minimum amount of memory space associated with each of said plurality of connections, said memory computing said number as a function of said total amount of memory used for storing said plurality of cells and said portion of said memory, wherein the changes to upper thresholds and the amount of said portion of memory space reserved enable said memory to be allocated efficiently among said plurality of connections.

15. The switch of claim 14, wherein said first connection comprises a multicast connection and said new cell comprises a unicast cell.

16. The switch of claim 14, wherein said first connection comprises a multicast connection and said new cell comprises a multicast cell having a first plurality of branches for transmission on a first port card and a second plurality of branches for transmission on a second port card.

17. The switch of claim 16, wherein traffic managers in said plurality of port cards determine the amount of memory space used by a multicast connection to equal the amount of memory space used by the longest branch served by a corresponding port card.

18. The switch of claim 17, wherein said memory manager is designed to receive a reject signal from said second port card and said reservation decrement signal from said first port card in relation to a second multicast cell corresponding to a second multicast connection, and wherein said memory manager does not decrements said portion of memory space in spite of receiving said reservation decrement signal due to the reception of said reject signal.

19. The switch of claim 17, wherein said memory manager is designed to decrement said portion of said memory space in response to said reservation decrement signal only if a reject signal is not received from any of said port cards.

20. The switch of claim 17, wherein said memory manager is designed to receive a plurality of reservation increment signals in relation to a transmission of said multicast cell, and wherein said memory manager increments said portion of memory in response to a first received one of said plurality of reservation increment signals.

21. The switch of claim 20, wherein said memory manager is designed to set a bit to a first logical value if at least one reject signal is received with the reception of said multicast cell and to a second logical value if no reject signal is received with the reception of said multicast cell, and wherein said memory manager sets said bit to said second logical value upon incrementing said portion of memory in response to said first received one of said plurality of reservation increment signals.

22. The switch of claim 17, wherein said memory manager is designed to receive a plurality of reservation increment signals in relation to a transmission of said multicast cell, and wherein said memory manager increments said portion of memory after receiving all of said plurality of reservation increment signals.

* * * * *